United States Patent
Li

(10) Patent No.: US 12,525,127 B2
(45) Date of Patent: Jan. 13, 2026

(54) MULTI-VEHICLE COLLABORATIVE TRAJECTORY PLANNING METHOD, APPARATUS AND SYSTEM, AND DEVICE, STORAGE MEDIUM, AND COMPUTER PROGRAM PRODUCT

(71) Applicant: BEIJING JINGDONG QIANSHI TECHNOLOGY CO., LTD., Beijing (CN)

(72) Inventor: Bai Li, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 676 days.

(21) Appl. No.: 17/790,648

(22) PCT Filed: Dec. 30, 2020

(86) PCT No.: PCT/CN2020/141598
§ 371 (c)(1),
(2) Date: Jul. 1, 2022

(87) PCT Pub. No.: WO2021/136424
PCT Pub. Date: Jul. 8, 2021

(65) Prior Publication Data
US 2023/0045935 A1    Feb. 16, 2023

(30) Foreign Application Priority Data
Jan. 2, 2020    (CN) .......................... 202010001027.8

(51) Int. Cl.
*G08G 1/16*    (2006.01)
*G01C 21/34*    (2006.01)
(52) U.S. Cl.
CPC ......... *G08G 1/166* (2013.01); *G01C 21/3446* (2013.01)

(58) Field of Classification Search
CPC .............. G05D 1/0287; G01C 21/3446; G01C 21/3407; G01C 21/3804; G01C 21/3885;
(Continued)

(56) References Cited

U.S. PATENT DOCUMENTS

2013/0335273 A1 * 12/2013 Pakzad ................. H04W 4/023
342/458
2014/0316635 A1 * 10/2014 Bando .................. G05D 1/0274
701/25

(Continued)

FOREIGN PATENT DOCUMENTS

CN    106251016 A    12/2016
CN    108664024 A    10/2018
(Continued)

OTHER PUBLICATIONS

Zhang Danlu et al., "Cooperative Path Planning in Multi-robots for Intelligent Warehouse", Computer Integrated Manufacturing Systems, vol. 24 No. 2, Feb. 28, 2018, pp. 410-418.

(Continued)

*Primary Examiner* — Donald J Wallace
(74) *Attorney, Agent, or Firm* — Cooper Legal Group, LLC

(57) ABSTRACT

Provided is a multi-vehicle collaborative trajectory planning method, apparatus (600) and system, and a device, a storage medium, and a computer program product. The method comprises: determining a specific number of different multi-vehicle priority schemes for multiple vehicles (S101); determining, by using a sequential planning policy, a corresponding collaborative planning scheme for each multi-vehicle priority scheme (S102); performing quality evaluation on each collaborative planning scheme to obtain a quality evaluation result (S103); and according to the quality evaluation result, determining a target collaborative planning (Continued)

scheme from the specific number of collaborative planning schemes (S104).

20 Claims, 10 Drawing Sheets

(58) Field of Classification Search
CPC ........ G08G 1/164; G08G 1/165; G08G 1/166; B60W 2556/45; B60W 2756/10; B60W 60/00276; B60W 60/001
See application file for complete search history.

(56) References Cited

U.S. PATENT DOCUMENTS

| | | | |
|---|---|---|---|
| 2019/0312779 A1 | 10/2019 | Magzimof et al. | |
| 2021/0012399 A1 | 1/2021 | Machida | |
| 2021/0125500 A1* | 4/2021 | Mortazavi | ............ G08G 1/0133 |

FOREIGN PATENT DOCUMENTS

| | | |
|---|---|---|
| CN | 108919803 A | 11/2018 |
| CN | 109448434 A | 3/2019 |
| CN | 109764882 A | 5/2019 |
| CN | 110083166 A | 8/2019 |
| CN | 110260872 A | 9/2019 |
| CN | 110264120 A | 9/2019 |
| CN | 110335489 A | 10/2019 |
| CN | 111735466 A | 10/2020 |
| JP | 2009054110 A | 3/2009 |
| JP | 2014185942 A | 10/2014 |
| JP | 2017197150 A | 11/2017 |
| JP | 2019045426 A | 3/2019 |
| WO | 2013069054 A1 | 5/2013 |
| WO | 2019152014 A1 | 8/2019 |
| WO | 2019186801 A1 | 10/2019 |

OTHER PUBLICATIONS

He Lina, "Study on Optimization Technology of Path Planning for AGV System", Electronic Technology&Information Science, China Master's Theses Full-text Database, No. 12, Dec. 15, 2011, ISSN: 1674-0246.
International Search Report in the international application No. PCT/CN2020/141598, mailed on Mar. 24, 2021.
English translation of the Written Opinion of the International Search Authority in the international application No. PCT/CN2020/141598, mailed on Mar. 24, 2021.
J.P. van den Berg et al., "Prioritized Motion Planning for Multiple Robots", 2005 IEEE, pp. 2217-2222.
Jing Shoucai et al: "Cooperative Game Approach to Optimal Merging Sequence and on-Ramp Merging Control of Connected and Automated Vehicles", IEEE Transactions on Intelligent Transportationsystems, IEEE, Piscataway, NJ, USA, vol. 20, No. 11, Nov. 1, 2019 (Nov. 1, 2019), pp. 4234-4244,XP011754754, ISSN: 1524-9050, DOI: 10.1109/TITS.2019.2925871[retrieved on Nov. 6, 2019]. 11 pages.
During Michael et al: "Cooperative decentralized decision making for conflict resolution among autonomous agents",2014 IEEE International Symposium on Innovations in Intelligent Systems and Applications (INISTA)Proceedings, IEEE, Jun. 23, 2014 (Jun. 23, 2014), pp. 154-161,XP032634804, DOI: 10.1109/INISTA.2014.6873612[retrieved on Aug. 7, 2014]. 8 pages.
Supplementary European Search Report in the European application No. 20908904.4, mailed on May 23, 2023. 11 pages.

* cited by examiner

MULTI-VEHICLE COLLABORATIVE TRAJECTORY PLANNING METHOD, APPARATUS AND SYSTEM, AND DEVICE, STORAGE MEDIUM, AND COMPUTER PROGRAM PRODUCT

CROSS-REFERENCE TO RELATED APPLICATION

This application is based upon and claims priority to Chinese Patent Application No. 202010001027.8 filed on Jan. 2, 2020, the disclosure of which is hereby incorporated by reference in its entirety.

TECHNICAL FIELD

The present disclosure relates to, but is not limited to, the field of automatic driving, and in particular, to a method, apparatus and system for multi-vehicle collaborative trajectory planning, a device, a storage medium, and a computer program product.

BACKGROUND

With the development of an automatic driving technology, multi-vehicle collaborative trajectory planning plays a very important role in the future. In a main landing scenario of an autonomous vehicle, for example, in scenarios such as multi-vehicle coordinated lane change and formation reconfiguration, collaborative trajectory planning based on multiple vehicles can save space and time, thereby enhancing practical application efficiency. In related art, a multi-vehicle collaborative trajectory planning method has a poor solution quality and a slow solution speed, which is not completely in conformity with actual requirements in the field of automatic driving. Therefore, how to improve the solution quality and solution speed of collaborative trajectory planning is an urgent problem for those skilled in the art.

SUMMARY

In view of this, embodiments of the present disclosure provide a method, apparatus and system for multi-vehicle collaborative trajectory planning, a device, a storage medium, and a computer program product.

The technical solutions of the embodiments of the present disclosure are implemented as follows.

An embodiment of the present disclosure provides a multi-vehicle collaborative trajectory planning method. The method includes the following operations.

A specific number of different multi-vehicle priority schemes are determined for multiple vehicles.

By using a sequential planning policy, a respective collaborative planning scheme is determined for each of the multi-vehicle priority schemes.

Quality evaluation is performed on each of a specific number of collaborative planning schemes to obtain a respective quality evaluation result.

According to the quality evaluation results, a target collaborative planning scheme is determined from the specific number of collaborative planning schemes.

In some embodiments, the method further includes: receiving a respective present position information and environment perception information that are transmitted by each of the multiple vehicles; determining a respective target trajectory for each vehicle according to the target collaborative planning scheme; and transmitting each of target trajectories to a respective one of the multiple vehicles.

In some embodiments, the determining the specific number of different multi-vehicle priority schemes for the multiple vehicles includes: starting a specific number of threads in parallel; and randomly determining, through each of the specific number of threads, a respective vehicle priority scheme for the multiple vehicles.

In some embodiments, the determining, by using the sequential planning policy, the respective collaborative planning scheme for each multi-vehicle priority scheme includes: for each of the multi-vehicle priority schemes, performing trajectory planning on each of the multiple vehicles one by one according to a give-way priority sequence of the vehicle in the multi-vehicle priority scheme, to obtain a collaborative planning scheme corresponding to the multi-vehicle priority scheme.

In some embodiments, the performing trajectory planning on each of the multiple vehicles one by one according to the give-way priority sequence of the vehicle in the multi-vehicle priority scheme, to obtain the collaborative planning scheme corresponding to the multi-vehicle priority scheme includes: determining a to-be-planned vehicle from the multiple vehicles according to the multi-vehicle priority scheme; determining a traveling trajectory for the to-be-planned vehicle according to a position of an obstacle in a current environment; adding the traveling trajectory into a planned trajectory set; and responsive to the to-be-planned vehicle being a last vehicle, determining all of trajectories in the planned trajectory set as the collaborative planning scheme corresponding to the multi-vehicle priority scheme.

In some embodiments, the performing trajectory planning on each of the multiple vehicles one by one according to a give-way priority sequence of the vehicle in the multi-vehicle priority scheme, to obtain the collaborative planning scheme corresponding to the multi-vehicle priority scheme further includes: responsive to the to-be-planned vehicle being not the last vehicle, updating a vehicle traveling according to the traveling trajectory into the current environment as an obstacle; determining a vehicle following the to-be-planned vehicle as a new to-be-planned vehicle according to the multi-vehicle priority scheme; determining a traveling trajectory for the new to-be-planned vehicle according to a position of an obstacle in an updated current environment; and adding the traveling trajectory into the planned trajectory set.

In some embodiments, the traveling trajectory includes a traveling path and a matching speed during the traveling along the traveling path. The obstacle in the current environment includes a static obstacle and a dynamic obstacle. The operation of determining the traveling trajectory for the to-be-planned vehicle according to the position of the obstacle in the current environment includes: performing path planning by using a hybrid A* algorithm according to a position of the static obstacle, to obtain a traveling path of the to-be-planned vehicle; determining a Space-Time (S-T) scatter diagram corresponding to the dynamic obstacle based on the traveling path and a movement trajectory of the dynamic obstacle; and determining, based on the S-T scatter diagram and by using the A* algorithm, the matching speed when the to-be-planned vehicle travels along the traveling path.

In some embodiments, the quality evaluation result includes a respective total mileage of each collaborative planning scheme. The performing quality evaluation on each collaborative planning scheme to obtain a respective quality evaluation result includes: determining path lengths of vehicles in each collaborative planning scheme; and for each collaborative planning scheme, accumulating the path lengths of the vehicles in the collaborative planning scheme, to obtain the total mileage of the collaborative planning scheme. Correspondingly, the operation of determining the target collaborative planning scheme from the specific number of collaborative planning schemes according to the quality evaluation results includes: according to the respective total mileage of each collaborative planning scheme, determining the collaborative planning scheme of which total mileage satisfies a condition as the target collaborative planning scheme from the specific number of collaborative planning schemes.

An embodiment of the present disclosure provides a multi-vehicle collaborative trajectory planning apparatus. The apparatus includes a first determination module, a second determination module, an evaluation module, and a third determination module.

The first determination module is configured to determine a specific number of different multi-vehicle priority schemes for multiple vehicles.

The second determination module is configured to determine, by using a sequential planning policy, a respective collaborative planning scheme for each of the multi-vehicle priority schemes.

The evaluation module is configured to perform quality evaluation on each collaborative planning scheme to obtain a respective quality evaluation result.

The third determination module is configured to, according to the quality evaluation results, determine a target collaborative planning scheme from the specific number of collaborative planning schemes.

An embodiment of the present disclosure provides a multi-vehicle collaborative trajectory planning system. The system includes a centralized platform and at least two vehicles. The centralized platform is configured to: generate a target collaborative planning scheme by means of the above method; and transmit the target collaborative planning scheme to each vehicle. Each of the at least two vehicles is configured to: receive the target collaborative planning scheme from the centralized platform; obtain a target trajectory of the vehicle in the target collaborative planning scheme; and travel according to the target trajectory.

An embodiment of the present disclosure provides a computer device. The computer device includes a memory and a processor. The memory stores a computer program executable by the processor. The processor, when executing the computer program, performs operations in the above method.

An embodiment of the present disclosure provides a computer-readable storage medium. The computer-readable storage medium stores a computer program. Operations of the above method are implemented when the computer program is executed by a processor.

An embodiment of the present disclosure provides a computer program product. The computer program product includes a non-transitory computer-readable storage medium storing a computer program. When the computer program is read and executed by a computer, operations in the above method are implemented.

In an embodiment of the present disclosure, for multi-vehicle priority schemes, sequential planning policies are respectively used to determine multiple corresponding collaborative planning schemes, and quality evaluation is performed on each scheme to obtain an optimal scheme from the multiple schemes as the final collaborative planning scheme. In this way, the quality of collaborative trajectory planning may be improved. In addition, the number of the vehicle priority schemes may be set according to actual situations. Solution on a complete set of priority sequences is not required. Therefore, a computation quantity may be reduced, and trajectory planning efficiency may be enhanced.

DETAILED DESCRIPTION

For making the purposes, technical solutions and advantages of the present disclosure clearer, the technical solutions of the present disclosure will further be described below in combination with the drawings and embodiments in detail. The described embodiments should not be considered as limits to the present disclosure. All other embodiments obtained by those of ordinary skill in the art without creative work shall fall within the scope of protection of the present disclosure.

"Some embodiments" involved in the following descriptions describes a subset of all possible embodiments. However, it can be understood that "some embodiments" may be the same subset or different subsets of all the possible embodiments, and may be combined without conflicts.

If a similar description of "first/second" appears in the application documents, the following description is added. Term "first/second/third" involved is only for distinguishing similar objects and does not represent a specific sequence of the objects. It can be understood that "first/second/third" may be interchanged to specific sequences or orders if allowed to implement the embodiments of the present disclosure described herein in sequences except the illustrated or described ones.

Unless otherwise defined, all technical and scientific terms in the specification have the same meaning as those skilled in the art, belonging to the present disclosure, usually understand. Terms used in the specification are only used for describing the purpose of the embodiments of the present disclosure, but not intended to limit the present disclosure.

Figure 1:
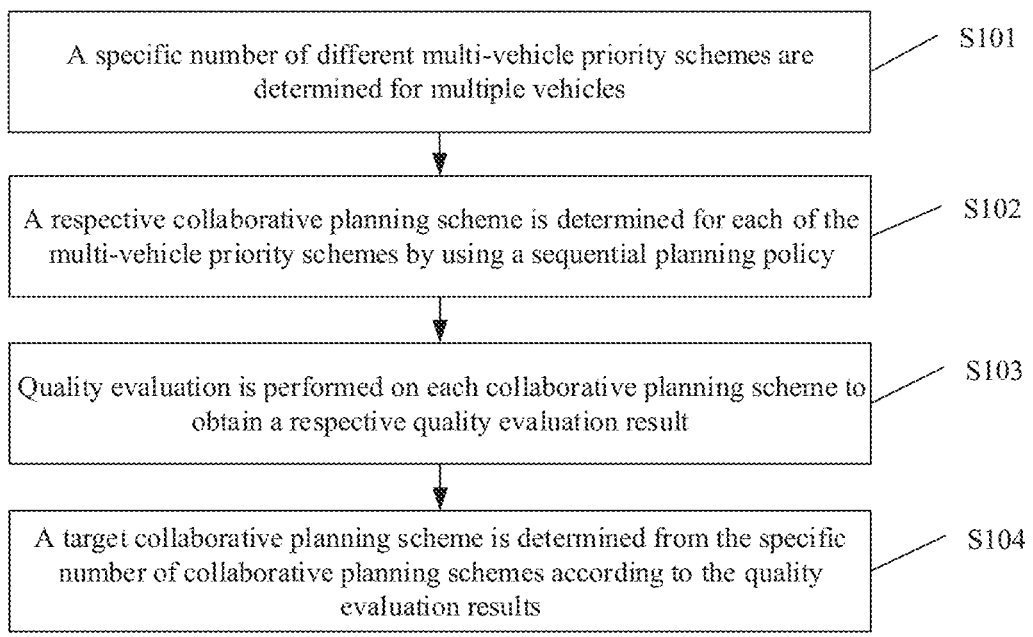
FIG. 1 is a schematic implementation flowchart of a multi-vehicle collaborative trajectory planning method according to an embodiment of the present disclosure.

An embodiment of the present disclosure provides a multi-vehicle collaborative trajectory planning method. The method determines, for more than one unmanned vehicle, a traveling trajectory of each vehicle within same time and space area, and guarantees that the trajectory accords with the law of vehicle kinematics, the trajectory does not collide with an obstacle in an environment, and the vehicles do not collide with each other. FIG. 1 is a schematic implementation flowchart of the method. The method may be executed by a processor. As shown in FIG. 1, the method includes the following operations.

At S101, a specific number of different multi-vehicle priority schemes are determined for multiple vehicles.

Herein, the multi-vehicle priority scheme is a priority sequence that trajectory planning is performed on each of the multiple vehicles, which reflect the priority of mutual comity between the vehicles. The processor may determine a set of multi-vehicle priority schemes according to a certain priority determination policy. The specific number may be a numerical value that is preset according to actual needs and stored in a local memory, or may be a default numerical value set by the processor. According to the set number, the processor may determine a corresponding number of multiple sets of vehicle priority sequences.

During implementation, when the processor determines the set number of different priority schemes, the processor may determine the set number of the vehicle priority sequences in batches by using the same priority determination policy, or may determine each set of the vehicle priority sequences according to different priority determination policies. In some embodiments, the priority sequence of each vehicle may be determined randomly. For example, assuming that there are total Nv vehicles, Nv is an integer greater than 1, $\{1, \ldots, Nv\}$ is randomly set to be out-of-order, so that a set of vehicle priority sequences may be determined. In some embodiments, the priority sequence of each vehicle may alternatively be determined according to types of the vehicles. For example, the priority of a small vehicle is higher than that of a medium vehicle, and the priority of the medium vehicle is higher than that of a large vehicle.

At S102, a respective collaborative planning scheme is determined for each of the multi-vehicle priority schemes by using a sequential planning policy.

Herein, the method for determining a multi-vehicle collaborative planning scheme by using the sequential planning policy is to perform trajectory planning on each vehicle one by one. A trajectory of a first vehicle is planned first. In this case, other vehicles are ignored, and a dynamic obstacle (such as a pedestrian and a pet) and a static obstacle (such as an isolation pile and a curb) in an environment are only considered. Then, when a trajectory of a second vehicle is planned, not only the dynamic and static obstacles are considered, but also the trajectory of the first vehicle is considered. In this way, iteration is kept, until a trajectory of the last vehicle in all of the vehicles is determined. The planned trajectories of the vehicles are collectively referred to as a collaborative trajectory, which constitutes a collaborative planning scheme (that is, a set of multi-vehicle collaborative traveling trajectories), and reflects the ability of each vehicle to achieve mutual comity between each other according to a certain priority sequence and jointly complete a cooperative traveling task.

During implementation, a respective collaborative planning scheme is determined for each multi-vehicle priority scheme. Calculation may be performed in a serial manner, that is, for each priority scheme, the respective collaborative planning scheme is determined in turn. In some embodiments, a parallel manner may be alternatively used for processing. That is to say, for each priority scheme, the respective collaborative planning scheme is determined in parallel.

At S103, quality evaluation is performed on each collaborative planning scheme to obtain a respective quality evaluation result.

Herein, the processor performs quality evaluation on each collaborative planning scheme. During implementation, according to actual requirements, one or more indexes of the collaborative planning scheme may be selected as quality evaluation indexes, to perform quality evaluation. Each trajectory in the set of multi-vehicle collaborative traveling trajectories has a respective path length. In some embodiments, path lengths of all of the vehicles may be accumulated to obtain a total mileage of the collaborative trajectory, and the quality of the collaborative planning scheme may be reflected through the total mileage. Since people tend to choose a path without detouring in daily life, the quality of the collaborative planning scheme may be better with the shorter total mileage.

In some embodiments, traveling time of all of the vehicles may be accumulated; the quality of the collaborative planning scheme may also be reflected through total traveling time. It is believed that the quality of the collaborative planning scheme may be better with shorter total traveling time.

During implementation, the quality evaluation indexes may further include, but are not limited to, one or more of: a total number of traffic lights passed by all of the vehicles, a total number of obstacles that all of the vehicles detour, or a total cost of the traveling of all of the vehicles, Those skilled in the art may select an appropriate quality evaluation method for the multi-vehicle collaborative planning scheme according to an actual scenario. This embodiment is not limited thereto.

At S104, a target collaborative planning scheme is determined from the specific number of collaborative planning schemes according to the quality evaluation results.

Herein, the processor selects, according to the quality evaluation results of the specific number of collaborative planning schemes, a scheme with the optimal quality as a finally determined target collaborative planning scheme. In some embodiments, the scheme with the optimal quality may be a scheme of which total mileage is the shortest, or may be a scheme of which total traveling time is the shortest, or may alternatively be a scheme of which total number of the passed traffic lights, the total number of detoured obstacles, or the total traveling cost is minimum. Those skilled in the art may reasonably select according to the quality evaluation results. This embodiment is not limited thereto.

According to the multi-vehicle collaborative trajectory planning method provided in the embodiments of the present disclosure, for multiple multi-vehicle priority schemes, sequential planning policies are respectively used to determine multiple corresponding collaborative planning schemes, and quality evaluation is performed on each scheme to obtain an optimal scheme from the multiple schemes as the final collaborative planning scheme. In this way, the quality of collaborative trajectory planning may be improved. In addition, the number of the vehicle priority schemes may be set according to actual situations, without the need to solve the full set of priority sequences, which can reduce the amount of calculation and enhance trajectory planning efficiency.

Figure 2:
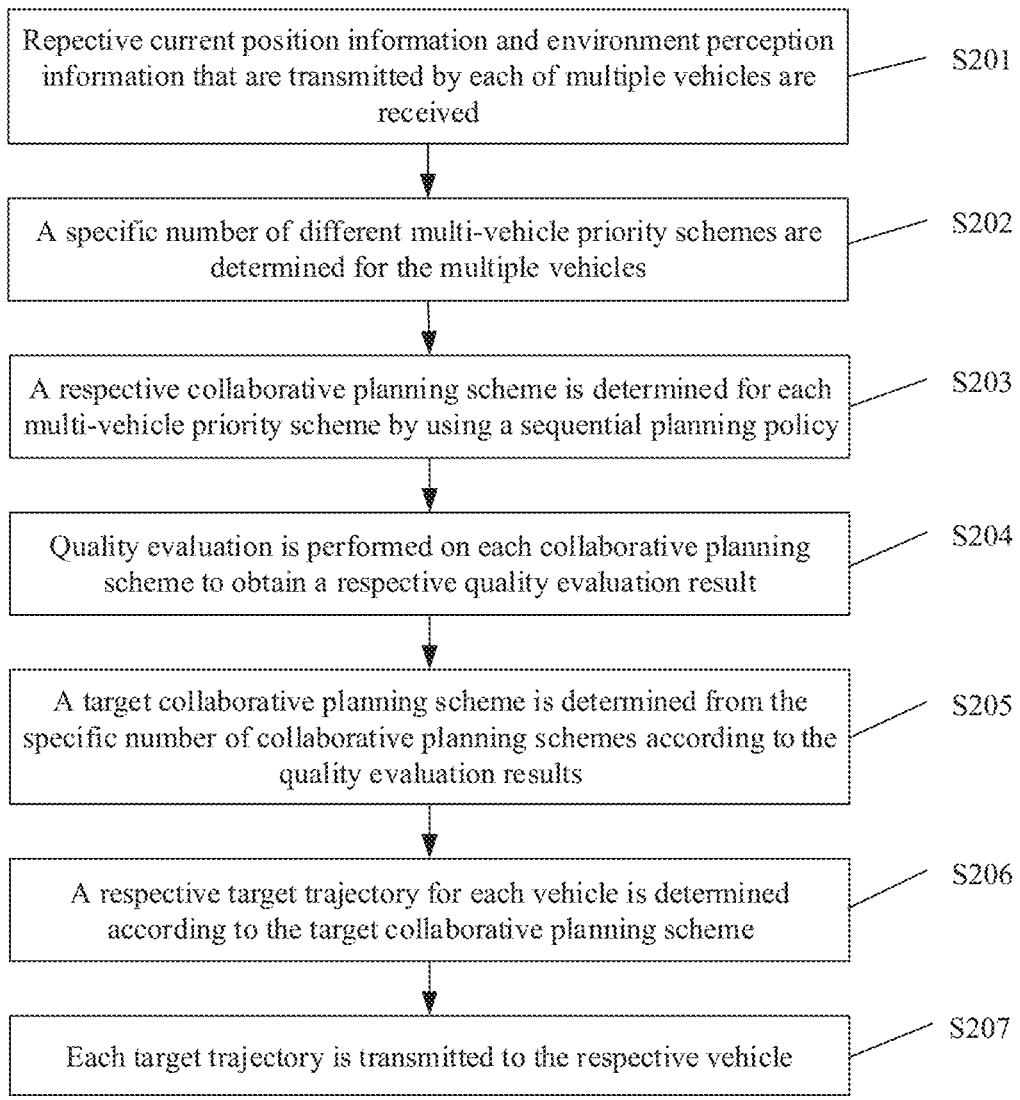
FIG. 2 is a schematic implementation flowchart of a multi-vehicle collaborative trajectory planning method according to an embodiment of the present disclosure.

An embodiment of the present disclosure provides a multi-vehicle collaborative trajectory planning method. FIG. 2 is a schematic implementation flowchart of the method. The method is executed by a processor. As shown in FIG. 2, the method includes the following operations.

At S201, a respective present position information and environment perception information that are transmitted by each of multiple vehicles are received.

At S202, a specific number of different multi-vehicle priority schemes are determined for the multiple vehicles.

At S203, a respective collaborative planning scheme is determined for each multi-vehicle priority scheme by using a sequential planning policy.

At S204, quality evaluation is performed on each collaborative planning scheme to obtain a respective quality evaluation result.

At S205, a target collaborative planning scheme is determined from the specific number of collaborative planning schemes according to the quality evaluation results.

At S206, a respective target trajectory for each vehicle is determined according to the target collaborative planning scheme.

At S207, each target trajectory is transmitted to the respective vehicle.

During implementation, the communication between the processor and each of the multiple vehicles may include, but is not limited to, one or more of wireless communication modes such as satellite wireless communication and cellular mobile communication.

Each of the multiple vehicles may obtain the respective current position information of the vehicle by using one or more of positioning technologies such as a satellite positioning technology and a high-precision map technology. The perception information of an environment around the vehicle may be collected by mounting a sensor on the vehicle. The sensor may include, but is not limited to, one or more of a vehicle speed sensor, an acceleration sensor, an angular velocity sensor, a lidar, a camera, or an inertial sensor, and the like.

According to the multi-vehicle collaborative trajectory planning method provided in the embodiments of the present disclosure, for multiple multi-vehicle priority schemes, sequential planning policies are respectively used to determine multiple corresponding collaborative planning schemes, and quality evaluation is performed on each scheme to obtain an optimal scheme from the multiple schemes as the final collaborative planning scheme. In this way, the quality of collaborative trajectory planning may be improved. In addition, the number of the vehicle priority schemes may be set according to actual situations. Solution on a full set of priority sequences is not required. Therefore, a calculation amount may be reduced, and trajectory planning efficiency may be enhanced.

Figure 3:
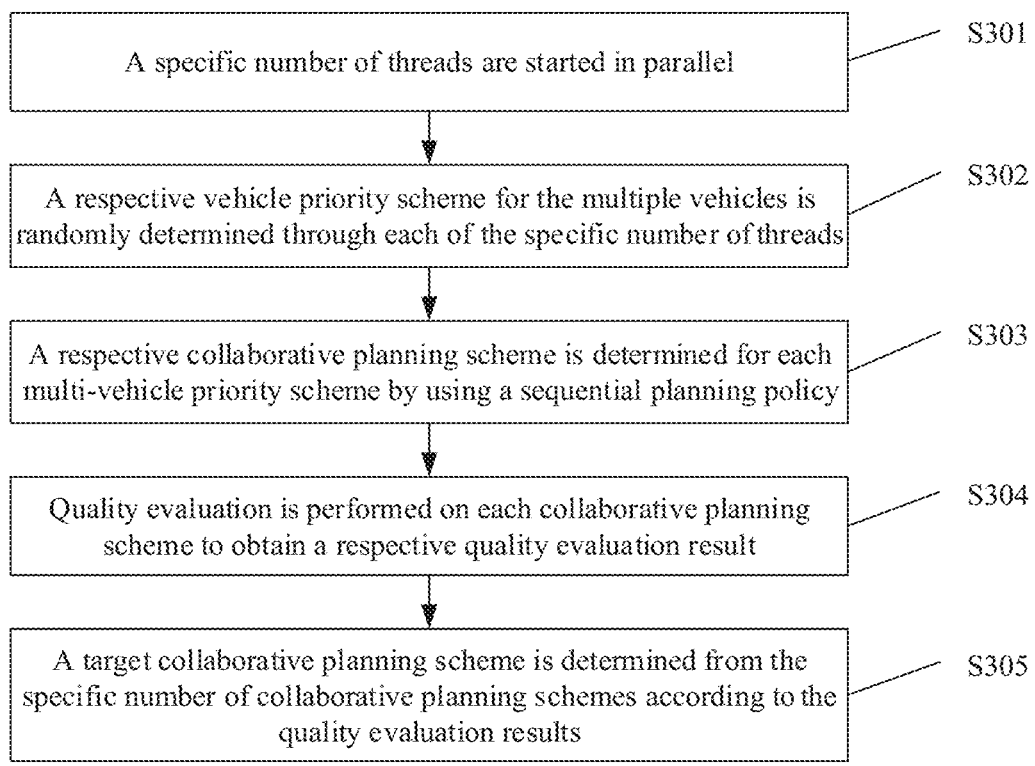
FIG. 3 is a schematic implementation flowchart of a multi-vehicle collaborative trajectory planning method according to an embodiment of the present disclosure.

An embodiment of the present disclosure provides a multi-vehicle collaborative trajector planning method. FIG. 3 is a schematic implementation flowchart of the method. The method is executed by a processor. As shown in FIG. 3, the method includes the following operations.

At S301, a specific number of threads are started in parallel.

At S302, a respective vehicle priority scheme for the multiple vehicles is randomly determined through each of the specific number of threads.

Herein, the priority sequence of each vehicle is determined randomly. During implementation, assuming that there are total NV vehicles, in some embodiments, $\{1, \ldots, N_v\}$ is randomly set to be out-of-order, so that the set of vehicle priority schemes may be determined.

Correspondingly, the specific number of multi-vehicle priority schemes is determined through the specific number of threads. During implementation, assuming that a set number is N and N is an integer greater than 1, in some embodiments, N sub-threads are started in parallel to determine N sets of vehicle priority schemes according to a method shown by the following pseudo-codes.

---

Input: the number N of scheme types required to be determined;
Output: a set $\Gamma$ storing N priority schemes;
1. Initialize $\Gamma = \emptyset$, $i = 0$ ;
2. While $i < N_{thread}$, do
3.   Randomly determine a priority scheme queue ;
4.   If queue is same as any element in the $\Gamma$, then
5.     Continue;
6.   Else
7.     $i \leftarrow i+1$ ;
8.     Saving the queue in the $\Gamma$ ;
9.   End if
10. End while
11. Output $\Gamma$ ;
12. Return.

---

The pseudo-codes of a loop body part may be simultaneously and respectively executed once by N threads. By means of the method shown by the above pseudo-codes, the set $\Gamma$ storing N priority schemes may be outputted according to the inputted number N of the scheme types required to be determined.

At S303, a respective collaborative planning scheme is determined for each multi-vehicle priority scheme by using a sequential planning policy.

At S304, quality evaluation is performed on each collaborative planning scheme to obtain a respective quality evaluation result.

At S305, a target collaborative planning scheme is determined from the specific number of collaborative planning schemes according to the quality evaluation results.

According to the multi-vehicle collaborative trajectory planning method provided in the embodiments of the present disclosure, for multiple multi-vehicle priority schemes, sequential planning policies are respectively used to determine multiple corresponding collaborative planning schemes, and quality evaluation is performed on each scheme to obtain an optimal scheme from the multiple schemes as the final collaborative planning scheme. In this way, the quality of collaborative trajectory planning may be improved. In addition, the number of the vehicle priority schemes may be set according to actual situations. Solution on a full set of priority sequences is not required. Therefore, a computation quantity may be reduced, and trajectory planning efficiency may be enhanced.

Figure 4A:
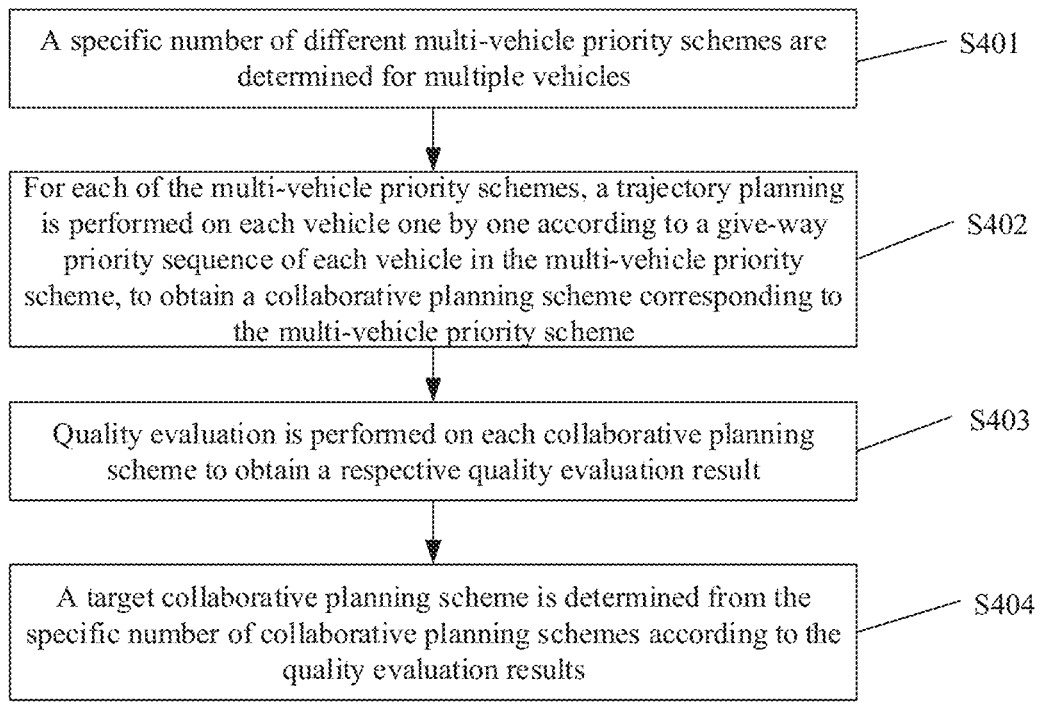
FIG. 4A is a schematic implementation flowchart of a multi-vehicle collaborative trajectory planning method according to an embodiment of the present disclosure.

An embodiment of the present disclosure provides a multi-vehicle collaborative trajectory planning method. FIG. 4A is a schematic implementation flowchart of the method. The method is executed by a processor. As shown in FIG. 4A, the method includes the following operations.

At S401, a specific number of different multi-vehicle priority schemes are determined for multiple vehicles.

At S402, for each of the multi-vehicle priority schemes, a trajectory planning is performed on each vehicle one by one according to a give-way priority sequence of the vehicle in the multi-vehicle priority scheme, to obtain a collaborative planning scheme corresponding to the multi-vehicle priority scheme.

Herein, a serial computation manner may be used. That is to say, a respective collaborative planning scheme for each multi-vehicle priority scheme is determined successively. Alternatively, a parallel computation manner may be used. That is to say, for each multi-vehicle priority scheme, the corresponding collaborative planning scheme is determined in parallel. In some embodiments, the parallel processing for each multi-vehicle priority scheme may be implemented in a manner of using multiple threads, so as to determine the corresponding collaborative planning schemes. The processor may perform trajectory planning on each vehicle one by one in each of N independent threads according to the give-way priority sequence of each vehicle in each multi-vehicle priority scheme, to obtain the corresponding collaborative planning scheme.

At S403, quality evaluation is performed on each collaborative planning scheme to obtain a respective quality evaluation result.

At S404, a target collaborative planning scheme is determined from the specific number of collaborative planning schemes according to the quality evaluation results.

Figure 4B:
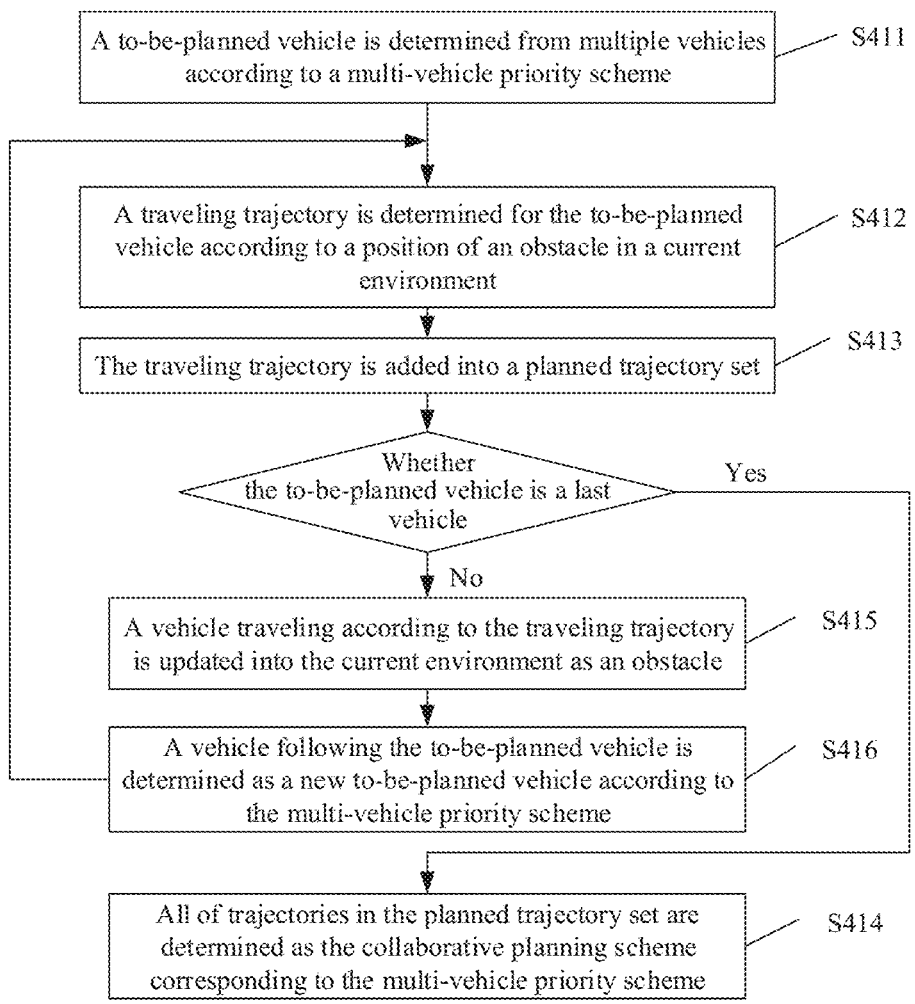
FIG. 4B is a schematic implementation flowchart of a multi-vehicle collaborative trajectory planning method for a single multi-vehicle priority scheme according to an embodiment of the present disclosure.

In some embodiments, according to a method shown in FIG. 4B, trajectory planning may be performed on each vehicle one by one according to the give-way priority sequence of each vehicle in the multi-vehicle priority scheme, to obtain the corresponding collaborative planning scheme. The method includes the following operations At S411, a to-be-planned vehicle is determined from the multiple vehicles according to the multi-vehicle priority scheme.

At S412, a traveling trajectory is determined for the to-be-planned vehicle according to a position of an obstacle in a current environment.

At S413, the traveling trajectory is added into the planned trajectory set.

At S414, when the to-be-planned vehicle is a last vehicle, all of trajectories in the planned trajectory set are determined as the collaborative planning scheme corresponding to the multi-vehicle priority scheme.

At S415, when the to-be-planned vehicle is not the last vehicle, a vehicle traveling according to the traveling trajectory is updated into the current environment as an obstacle.

At S416, a vehicle following the to-be-planned vehicle is determined as a new to-be-planned vehicle according to the multi-vehicle priority scheme, and S412 is returned.

Herein, during implementation, for S411 to S416, refer to a method shown by the following pseudo-codes. By using a sequential planning policy, a respective collaborative planning scheme is determined for each multi-vehicle priority scheme.

Input: a scenario environment, and a sequential planning priority scheme set Ψ;
Output: a multi-vehicle collaborative movement trajectory sol ;
1. Uniformly record original static and dynamic obstacles in an environment in a set Y according to an x-y-t format;
2. Initialize a solution set sol = Ø;
3. For each i ∈ Ψ
4. For an unmanned vehicle $\Psi_i$ corresponding to a i th element in the priority scheme set Ψ , perform trajectory planning, and record the planned trajectory as χ ;
5. Associate χ and $\Psi_i$ , and then record the two in the solution set sol together;

-continued

6. Record χ in Y ;
7. End for
8. Output sol ;
9. Return.

By means of the method shown by the pseudo-codes, under the premise of a certain given multi-vehicle priority scheme, a respective movement trajectory of each vehicle may be determined one by one based on the sequential planning policy, so as to determine the collaborative planning scheme.

In some embodiments, in each iteration of the sequential planning policy, after the distribution of the static obstacle and the movement of the dynamic obstacle in an ambient environment are determined, the trajectory planning on each single vehicle may adopt a planning method of combining a path and a speed. The method includes a path planning stage and a speed planning stage. The path planning stage is responsible for determining a traveling path of a current vehicle. The speed planning stage is responsible for determining a speed at which the vehicle responds to a movable obstacle in a scenario during traveling along an established path.

In some embodiments, at the path planning stage, the traveling path of the current vehicle is determined using a path selection algorithm. The path selection algorithm here includes, but is not limited to, any algorithm of a hybrid A* algorithm, an A* algorithm, or a Dijkstra algorithm. During implementation, those skilled in the art may freely select an appropriate path selection algorithm according to actual situations. This embodiment is not limited thereto.

In some embodiments, the speed planning stage may use a speed planning method based on an S-T diagram. The method classifies a speed planning task into an A* search task performed in the S-T diagram.

During implementation, the traveling trajectory may include a traveling path and a matching speed during the traveling along the traveling path. The obstacle in the current environment may include the static obstacle and the dynamic obstacle. The dynamic obstacle includes a vehicle of which priority is higher than that of the to-be-planned vehicle.

Figure 4C:
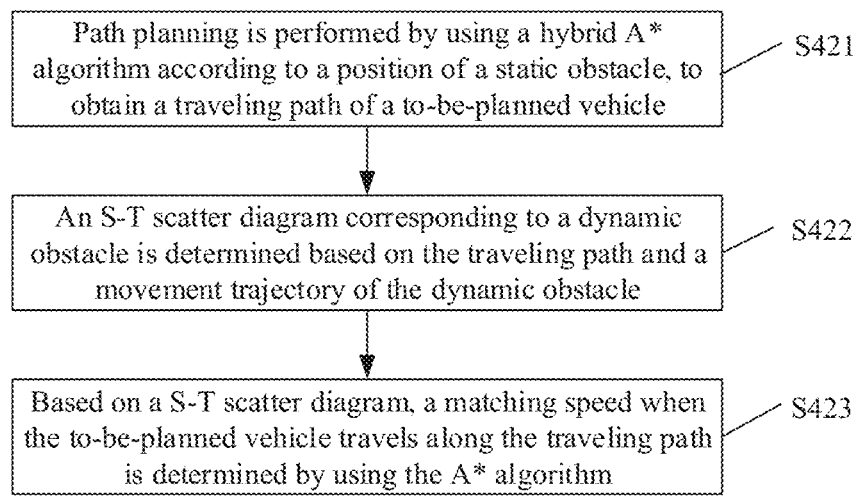
FIG. 4C is a schematic implementation flowchart of a trajectory planning method for a single vehicle according to an embodiment of the present disclosure.

Correspondingly, the operation illustrated in S412 may be a method shown in FIG. 4C. The method includes the following operations.

At S421, path planning is performed by using a hybrid A* algorithm according to a position of the static obstacle, to obtain a traveling path of the to-be-planned vehicle.

Herein, the traveling path may be determined for the to-be-planned vehicle by using the hybrid A* algorithm according to the position of the static obstacle in the environment.

At S422, an S-T scatter diagram corresponding to the dynamic obstacle is determined based on the traveling path and a movement trajectory of the dynamic obstacle.

Herein, a rectangular plane coordinate system using T as a horizontal axis and S as a vertical axis is required to be constructed, where T represents time, and S represents a mileage when the vehicle travels along a certain established path.

Figure 4D:
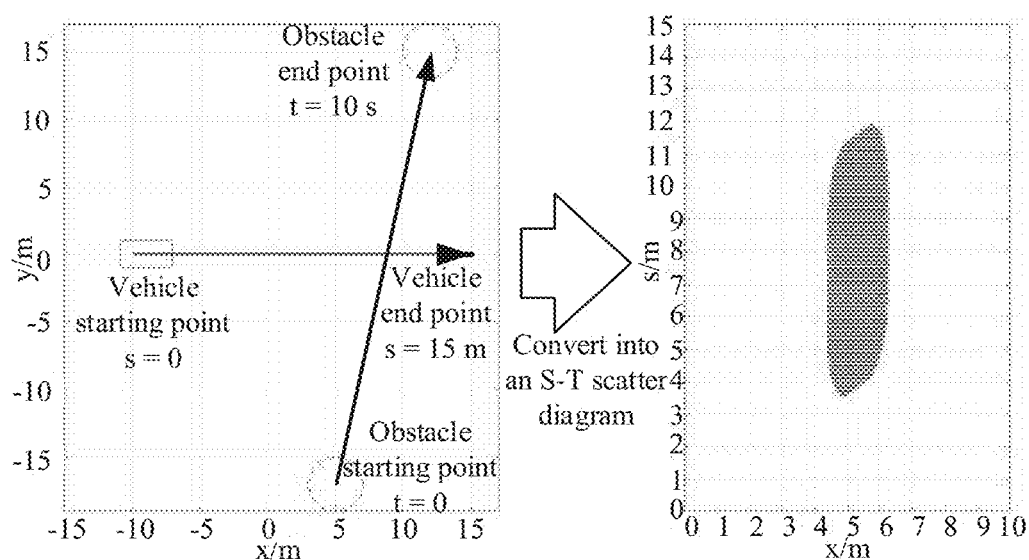
FIG. 4D is a schematic diagram of using an S-T scatter diagram to reflect a trajectory of a movable obstacle.

In order to represent the dynamic obstacle in the S-T coordinate system, a concept of vehicle footprint is introduced, that is, a projection of a vehicle body on the ground when the vehicle is in a certain pose [x, y, θ]. Herein, x,y represents a coordinate of the vehicle on a two-dimensional ground plane, and θ is an orientation of the vehicle body. The vehicle is moved along the established path from a starting end (that is, at a mileage s=0) to a ending end (at $s=s_{end}$). During this period, the vehicle footprint Ξ is determined every micro mileage interval Δs, and all of footprints Ξ and a corresponding mileage values s are recorded in a set Π. In another aspect, all of the dynamic obstacles are moved along respective movement trajectories from a starting end (that is, time t=0) to a ending end ($t=t_{end}$). During this period, a footprint γ of each dynamic obstacle is determined every micro time interval Δt, and whether γ is overlapped with any footprint Ξ in the set Π. If so, the overlapped time t and the mileage s corresponding to the footprint Ξ form a coordinate point (s,t) to mark in the S-T coordinate system. The footprints of all of the obstacles at each time and the vehicle footprints in the set Π are verified one by one, so that an atlas including a plurality of scattering points may be obtained. The scatter diagram reflects a situation that the vehicle encounters the dynamic obstacle when traveling along the traveling path. FIG. 4D is a schematic diagram of using an S-T scatter diagram to reflect a trajectory of a movable obstacle. In the drawing, Δs=0.1 m, and Δt=0.04 s.

At S423, based on the S-T scatter diagram, a matching speed when the to-be-planned vehicle travels along the traveling path is determined by using the A* algorithm.

Herein, after the S-T scatter diagram is obtained, the speed planning task may be classified into a task of "planning a path moving from an original point (0,0) to a straight line $s=s_{end}$" in the S-T diagram, which may be continuously use the A* algorithm to achieve solution. Specifically, an area $[0,t_{end}]\times[0,s_{end}]$ in the S-T coordinate system may be discretized according to grids. Grids including the scattering points are marked as obstacle occupation grids, that is, a grid connected graph is formed. Then the A* algorithm may be adopted to compute a trajectory line in the sense of S-T, which represents a speed condition at which the vehicle actually travels along a certain established path.

Through the above method, the processor may further determine, according to the traveling path of the vehicle, the speed at which the vehicle responds to the movable obstacle in the scenario during the traveling along the path, so as to achieve the trajectory planning of the signal vehicle.

It is to be noted that, the reflection of the trajectory of the movable obstacle by using the S-T scatter diagram and the computation of the trajectory line in the sense of S-T by using the A* algorithm both are exemplary implementations provided in this embodiment. Those skilled in the art may select an appropriate algorithm to implement the speed planning according to a practical application scenario. The embodiments of the present disclosure are not limited thereto.

According to the multi-vehicle collaborative trajectory planning method provided in the embodiments of the present disclosure, for multiple multi-vehicle priority schemes, sequential planning policies are respectively used to determine multiple corresponding collaborative planning schemes, and quality evaluation is performed on each scheme to obtain an optimal scheme from the multiple schemes as the final collaborative planning scheme. In this way, the quality of collaborative trajectory planning may be improved. In addition, the number of the vehicle priority schemes may be set according to actual situations. Solution on a full set of priority sequences is not required. Therefore, a calculation amount may be reduced, and trajectory planning efficiency may be enhanced.

An embodiment of the present disclosure provides a multi-vehicle collaborative trajectory planning method. The method generates, for a vehicle formation formed by more than one unmanned vehicle, a traveling trajectory of each vehicle within same time and space area, and guarantees that the trajectory accords with the law of vehicle kinematics, the trajectory does not collide with an obstacle in an environment, and the vehicles do not collide with each other.

In order to better understand the collaborative trajectory planning method for multiple unmanned vehicles provided in the embodiments of the present disclosure, herein, the method is logically divided into multiple sub-modules for description. The sub-modules involved in the method include a module A, a module B, a module C, a module ID, a module E, a module Z, and a module Y.

The module A refers to the multi-vehicle collaborative trajectory planning method based on the sequential policy.

Herein, the multi-vehicle collaborative trajectory planning method based on the sequential policy is to perform trajectory planning on each vehicle one by one. The method includes: first planning a trajectory of a first vehicle, in this case, ignoring other vehicles, and only considering a movable obstacle (such as a pedestrian and a pet) and a static obstacle (such as an isolation pile and a curb) in an environment; then, when a trajectory of a second vehicle is planned, not only considering the dynamic and static obstacles, but also considering the trajectory of the first vehicle; and keeping iteration, until a trajectory of the last vehicle in all of the vehicles is determined.

The planned trajectories of the vehicles are collectively referred to as a collaborative trajectory, which reflects the ability of each vehicle to achieve mutual comity between each other according to a certain priority sequence and jointly complete a cooperative travelinu task.

During implementation, a multi-vehicle collaborative traveling trajectory may be generated based on the method shown by the following pseudo-codes.

---

Input: a scenario environment, and a sequential planning priority sequence scheme set Ψ ;
  Output: a multi-vehicle collaborative movement trajectory sol ;
  1. Uniformly record original static and dynamic obstacles in an environment in a set Y according to an x-y-t format;
  2. Initialize a solution set sol = ∅;
  3. For each i ∈ Ψ
  4. For an unmanned vehicle $\Psi_i$ corresponding to a i th element in the priority scheme set Ψ , perform trajectory planning by using a method of the module Z, and record the planned trajectory as χ ;
  5. Associate χ and $\Psi_i$ , and then record the two in the solution set sol together;
  6. Record χ in Y ;
  7. End for
  8. Output sol ;
  9. Return.

---

By means of the method shown by the pseudo-codes, under the premise of a certain given vehicle priority sequence scheme, a movement trajectory of each vehicle may be determined one by one based on the sequential policy.

The module B refers to a method for generating a priority sequence of each vehicle in the vehicle formation.

Herein, the priority sequence of each vehicle is a priority sequence that trajectory planning is performed on each vehicle in the vehicle formation. The processor may generate a set of vehicle priority sequences according to a certain priority determination policy. In some embodiments, a respective priority sequence of each vehicle may be generated randomly. For example, it is assumed that there are total Nv vehicles, {1, . . . , Nv} is randomly set to be out-of-order, so that a set of vehicle priority sequences may be generated. In some embodiments, the priority sequences of the vehicles may alternatively be determined according to types of the vehicles. For example, the priority of a small vehicle is higher than that of a medium vehicle, and the priority of the medium vehicle is higher than that of a large vehicle.

The module C refers to a method for generating sequential vehicle planning priority sequence schemes in batches.

Herein, the processor generates multiple sets of different priority sequence schemes in batches. A same priority determination policy may be used to generate multiple sets of vehicle priority sequences according to a certain number, or a different priority determination policy may be used to generate each set of vehicle priority sequences.

In some embodiments, the processor generates the priority sequences of the vehicles in batches by using the priority sequence generation method involved in the module B. For example, N sets of vehicle priority sequences may be generated in batches according to a method shown by the following pseudo-codes.

```
Input: the number N of scheme types required to be generated;
Output: a set Γ storing N priority schemes;
  1. Initialize Γ = Ø , i = 0 ;
  2. While i < N_thread , do
  3.   Generate a priority scheme queue by using the module B;
  4.   If queue is same as any element in the Γ , then
  5.     Continue;
  6.   Else
  7.     i ←i+1 ;
  8.     Save the queue in the Γ ;
  9.   End if
 10. End while
 11. Output Γ ;
 12. Return.
```

By means of the method shown in the above pseudo-codes, the set Γ including N priority schemes may be outputted according to the inputted number N of the scheme types required to be generated.

The module D refers to a method for computing multiple schemes in parallel.

Herein, the processor processes a respective processing task for each vehicle priority sequence scheme in a manner of parallel computing. During implementation, the parallel computing may be implemented by using multiple threads. The processing task is to generate corresponding multi-vehicle collaborative traveling, trajectories according to each vehicle priority sequence scheme, or perform quality evaluation on the generated multi-vehicle collaborative traveling trajectories. In some embodiments, assuming that there are N different priority sequence schemes, the processor may generate the corresponding multi-vehicle collaborative traveling trajectories by using the method of the module A based on the respective priority sequence scheme in each of N independent threads, obtain N sets of collaborative traveling trajectories through summarizing, and evaluate the quality of collaborative trajectories finally outputted by each thread by using a method of the module E.

The module E refers to a collaborative trajectory planning quality evaluation method.

Herein, the processor may perform quality evaluation on the generated collaborative trajectories according to quality evaluation indexes of the collaborative trajectories. In some embodiments, since each trajectory in the set of multi-vehicle collaborative traveling trajectories has a respective path length, the path lengths of all of the vehicles may be accumulated to obtain a total mileage of the collaborative trajectories, and the total mileage is used as the quality evaluation index to evaluate the quality of the collaborative traveling trajectories. Since people tend to choose a path without detouring in daily life, the quality of the collaborative traveling trajectories may be better with the shorter total mileage.

In some embodiments, total traveling time may also be obtained by accumulating traveling time of all of the vehicles. The total traveling time is used as the quality evaluation index to evaluate the quality of the collaborative traveling trajectories. The quality of the collaborative traveling trajectories is better with the shorter traveling time.

During implementation, the quality evaluation indexes may further include, but are not limited to, one or more of: a total number of traffic lights passed by all of the vehicles, a total number of obstacles that all of the vehicles detour, or a total cost of the traveling of all of the vehicles. Those skilled in the art may select the quality evaluation indexes according to the actual scenario. This embodiment is not limited thereto.

The module Z refers to a trajectory planning method for a single vehicle.

Herein, in each iteration of the sequential planning policy, after the distribution of the static obstacle and the movement of the dynamic obstacle in an ambient environment are determined, the processor performs trajectory planning on each single vehicle. During implementation, a planning method of combining a path and a speed may be adopted. The method includes a path planning stage and a speed planning stage. The path planning stage is responsible for determining a traveling path of a current vehicle. The speed planning stage is responsible for determining a speed at which the vehicle responds to a movable obstacle in a scenario during traveling along an established path.

In some embodiments, at the path planning stage, the traveling path of the current vehicle is determined using a path selection algorithm. The path selection algorithm here includes, but is not limited to, any algorithm of a hybrid A* algorithm, an A* algorithm, or a Dijkstra algorithm. During implementation, those skilled in the art may freely select an appropriate path selection algorithm according to actual situations. This embodiment is not limited thereto.

The module Y refers to a speed planning method based on the S-T diagram and graph searching.

Herein, during implementation, at the speed planning stage, a speed planning method based on an S-T diagram may be adopted. The method classifies a speed planning task into an A* search task performed in the S-T diagram. A specific implementation process of the method are shown as follows.

First, a rectangular plane coordinate system using T as a horizontal axis and S as a vertical axis is constructed, where T represents time, and S represents a mileage when the vehicle travels along a certain established path.

In order to represent the movable obstacle in the S-T coordinate system, a concept of vehicle footprint is introduced, that is, a projection of a vehicle body on the ground when the vehicle is in a certain pose [x, y, θ]. Herein, x,y represents a coordinate of the vehicle on a two-dimensional ground plane, and θ is an orientation of the vehicle body. The vehicle is moved along the established path from a starting end (that is, at a mileage s=0) to a ending end (at s=$s_{end}$). During this period, the vehicle footprint Ξ is generated every micro mileage interval Δs and all of footprints Ξ and a corresponding mileage values s are recorded in a set Π. In another aspect, all of the movable obstacles are moved along respective trajectories from a starting end (that is, time t=0) to a ending end (t=$t_{end}$). During this period, a footprint γ of the movable obstacle is generated every micro time interval Δt, and whether γ is overlapped with any footprint Ξ in the set Π. If so, the overlapped time t and the mileage s corresponding to the footprint Ξ form a coordinate point (s,t) to mark in the S-T coordinate system. The footprints of all of the obstacles at each time and the vehicle footprints in the set Π are verified one by one, so that an atlas including a plurality of scattering points may be obtained. The scatter diagram reflects a situation that the vehicle encounters the movable obstacle when traveling along the established path. FIG. 4D is a schematic diagram of using an S-T scatter diagram to reflect a trajectory of a movable obstacle. In the drawing, Δs=0.1 m, and Δt=0.04 s.

After the S-T scatter diagram is obtained, the speed planning task may be classified into a task of "planning a path moving from an original point (0,0) to a straight line s=$s_{nd}$" in the S-T diagram, which may be continuously use the A* algorithm to achieve solution. Specifically, an area [0,$t_{end}$]×[0, $s_{end}$] in the S-T coordinate system may be discretized according to grids. Grids including the scattering points are marked as obstacle occupation grids, that is, a grid connected graph is formed. Then the A* algorithm may be adopted to compute a trajectory line in the sense of S-T, which represents a speed condition at which the vehicle actually travels along a certain established path.

Through the above method, the processor may further determine, according to the vehicle traveling path determined at the path planning stage, the speed at which the vcliicle responds to the movable obstacle in the scenario during the traveling along the path, so as to achieve the trajectory planning of the signal vehicle.

It is to be noted that, in the above speed planning stage, the reflection of the trajectory of the movable obstacle by using the S-T scatter diagram and the computation of the trajectory line in the sense of S-T by using the A* algorithm both are exemplary implementations provided in this embodiment. Those skilled in the art may select an appropriate algorithm to implement the speed planning according to a practical application scenario. The embodiments of the present disclosure are not limited thereto.

Figure 5A:
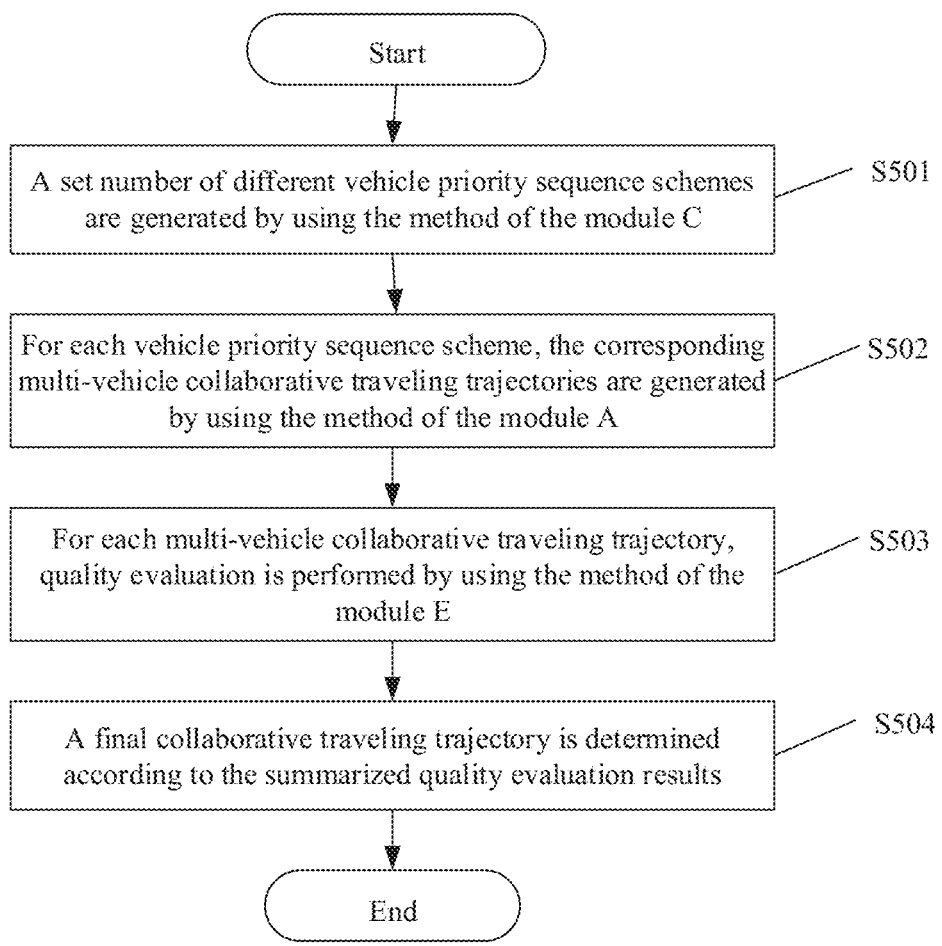
FIG. 5A is a schematic implementation flowchart of a multi-vehicle collaborative trajectory planning method according to an embodiment of the present disclosure.

Based on the above sub-modules, a complete implementation flow of the multi-vehicle collaborative trajectory planning method provided in the embodiments of the present disclosure is shown in FIG. 5A. The method is executed by a processor and includes the following operations.

At S501, a set number of different vehicle priority sequence schemes are generated by using the method of the module C.

Herein, the set number may be a numerical value that is preset according to actual needs and stored in a local memory, or may be a default numerical value set by the processor. The processor may generate, according to the set number, the corresponding number of multiple sets of vehicle priority sequences in batches by using the method of the module C.

At S502, for each vehicle priority sequence scheme, the corresponding multi-vehicle collaborative traveling trajectories are generated respectively by using the method of the module A.

At S503, for each multi-vehicle collaborative traveling trajectory, quality evaluation is performed by using the method of the module E.

Herein, when the processor executes operations illustrated in S502, a generation process of the multiple sets of multi-vehicle collaborative traveling trajectories may be executed in a parallel manner. That is to say, for each priority sequence scheme, the corresponding multi-vehicle collaborative traveling trajectories are generated in parallel. Alternatively, the generation process may also be executed in a serial manner. That is to say, for each priority sequence scheme, the corresponding multi-vehicle collaborative traveling trajectories are generated successively. Likewise, when the processor executes operations illustrated in S503, a process of performing quality evaluation on each multi-vehicle collaborative traveling trajectory may be executed in the parallel manner or the serial manner. In some embodiments, the processor may execute operations illustrated in S502 and/or S503 by using the method of the module D for computing multiple schemes in parallel to implement parallel processing for each priority scheme, so as to generate the corresponding multi-vehicle collaborative traveling trajectories and perform quality evaluation on the generated multi-vehicle collaborative traveling trajectories.

Figure 5B:
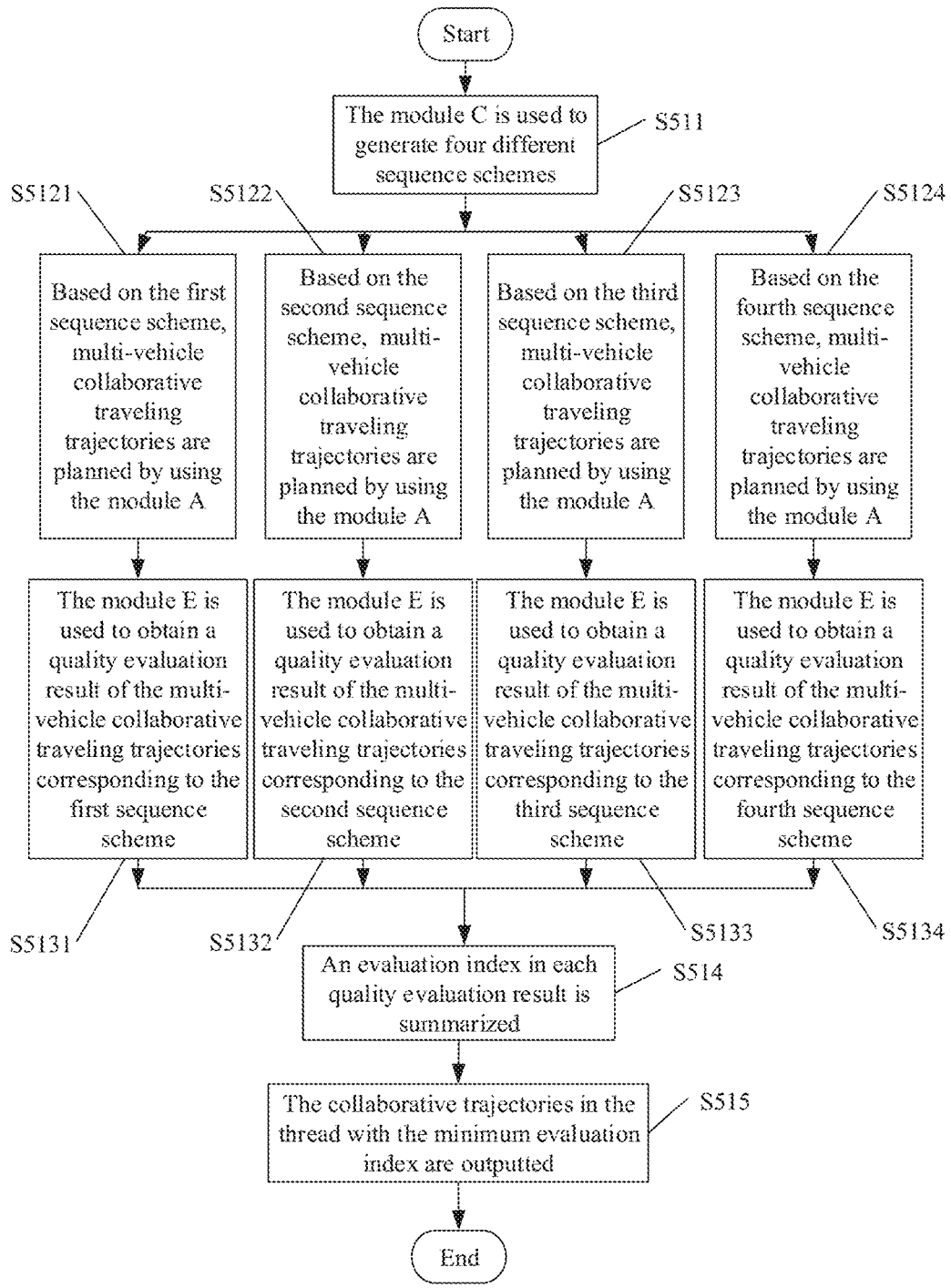
FIG. 5B is a schematic implementation flowchart of a multi-vehicle collaborative trajectory planning method according to an embodiment of the present disclosure.

For example, assuming that four vehicle priority sequence schemes are used, and when operations illustrated in each of S502 and S503 are executed in parallel, an implementation flow of the collaborative trajectory planning method for multiple unmanned vehicles provided in the embodiments of the present disclosure is shown in FIG. 5B. The processor may simultaneously generate the corresponding multi-vehicle collaborative traveling trajectories in parallel by using the method of the module A for the four vehicle priority sequence schemes, and perform quality evaluation on the generated multi-vehicle collaborative traveling trajectories by using the method of the module E. Referring to FIG. 5B, the method includes the following operations.

At S511, the module C is used to generate four different sequence schemes.

At S512i, based on a sequence scheme i, the multi-vehicle collaborative traveling trajectories are planned by using the module A.

At S513i, the module E is used to obtain a quality evaluation result of the multi-vehicle collaborative traveling trajectories corresponding to the sequence scheme i.

At S514, an evaluation index in each quality evaluation result is summarized.

At S515, the collaborative trajectories in the thread with the minimum evaluation index are outputted.

Step S512i and S513i may include multiple sets of operations executed in parallel. A value of i in each set of operations is 1, 2, 3, or 4, respectively.

At S504, a final collaborative traveling trajectory is determined according to the summarized quality evaluation results.

Herein, after the respective multi-vehicle collaborative traveling trajectory corresponding to each vehicle priority sequence scheme is obtained, the processor determines the collaborative traveling trajectory with the best quality as the final collaborative traveling trajectory by summarizing the quality evaluation results of multiple sets of multi-vehicle collaborative traveling trajectories.

According to the collaborative trajectory planning method for multiple unmanned vehicles provided in the embodiments of the present disclosure, based on the multiple multi-vehicle priority sequence schemes, the multiple sets of multi-vehicle collaborative traveling trajectories are generated by using the sequential policy. Quality evaluation is performed on the multiple sets of multi-vehicle collaborative traveling trajectories, to select the excellent collaborative traveling trajectories to form the final collaborative trajectory. In this way, the quality of the generated multi-vehicle collaborative traveling trajectories may be effectively improved. In addition, the respective movement trajectory of each vehicle may be rapidly generated by using a manner of combining path planning and speed planning. Through the adoption of parallel computation, the speed for generating the multiple sets of multi-vehicle collaborative traveling trajectories may be accelerated, so that the speed for generating the final multi-vehicle collaborative traveling trajectory can be integrally accelerated.

An embodiment of the present disclosure provides a multi-vehicle collaborative trajectory planning system. The system includes a centralized platform and at least two vehicles.

The centralized platform is configured to: generate a target collaborative planning scheme by using the multi-vehicle collaborative trajectory planning method provided in the foregoing embodiments; and transmit the target collaborative planning scheme to each vehicle.

Each of the at least two vehicles is configured to: receive the target collaborative planning scheme from the centralized platform; obtain a target trajectory of the vehicle in the target collaborative planning scheme; and travel according to the target trajectory.

Herein, each of the at least two vehicles may be an unmanned vehicle, or may be a vehicle driven by a driver. The centralized platform may transmit the target collaborative planning scheme to each vehicle in a broadcast manner or through a dedicated channel by using its own communication device. When the target collaborative planning scheme is transmitted, the traveling trajectories of all vehicles in the target collaborative planning scheme may be transmitted to each vehicle, or a respective target trajectory of each vehicle may be transmitted to the vehicle. Limitations are not proposed herein. During implementation, the communication between the centralized platform and the at least two vehicles may include, but is not limited to, one or more of wireless communication modes such as satellite wireless communication and cellular mobile communication. Each vehicle may track and control the vehicle to travel according to the target trajectory by using a vehicle chassis controller.

In some embodiments, the centralized platform may further be configured to: establish the communication with each of the at least two vehicles alone by using its own communication device; and receive respective current position information transmitted by each vehicle and environment perception information around each vehicle. Each of the at least two vehicles may further be configured to: obtain the current position information of the vehicle and the environment perception information around the vehicle; and transmit the position information and the environment perception information to the centralized platform.

The unmanned vehicle may obtain the current position information of the vehicle by using one or more of positioning technologies such as a satellite positioning technology and a high-precision map technology. The perception information of an environment around the unmanned vehicle may be collected by mounting a sensor on the vehicle. The sensor may include, but is not limited to, one or more of a vehicle speed sensor, an acceleration sensor, an angular velocity sensor, a lidar, a camera, or an inertial sensor.

Based on the foregoing embodiments, an embodiment of the present disclosure provides a multi-vehicle collaborative trajectory planning apparatus. The apparatus includes the included units and modules included in the units, and may be implemented by using a processor in a computer device. Definitely, the apparatus may alternatively be implemented by using a specific logic circuit. During implementation, the processor may be a Central Processing Unit (CPU), a Micro Processor Unit (MPU), a Digital Signal Processor (DSP), or a Field Programmable Gate Array (FPGA).

Figure 6:
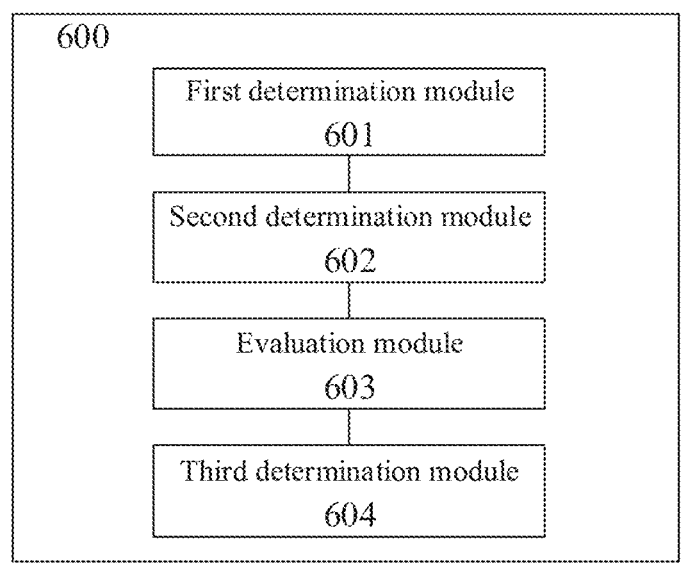
FIG. 6 is a schematic diagram of a composition structure of a multi-vehicle collaborative trajectory planning apparatus according to an embodiment of the present disclosure.

FIG. 6 is a schematic diagram of a composition structure of a multi-vehicle collaborative trajectory planning apparatus according to an embodiment of the present disclosure. As shown in FIG. 6, the apparatus 600 includes a first determination module, a second determination module, an evaluation module, and a third determination module.

The first determination module 601 is configured to determine a specific number of different multi-vehicle priority schemes for multiple vehicles.

The second determination module 602 is configured to determine, by using a sequential planning policy, a respective collaborative planning scheme for each of the multi-vehicle priority schemes.

The evaluation module 603 is configured to perform quality evaluation on each of a specific number of collaborative planning schemes to obtain a respective quality evaluation result.

The third determination module 604 is configured to determine a target collaborative planning scheme from the specific number of collaborative planning schemes according to quality evaluation results.

In some embodiments, the apparatus further includes a receiving module, a fourth determination module, and a transmission module.

The receiving module is configured to receive a respective current position information and environment perception information that are transmitted by each of the multiple vehicles.

The fourth determination module is configured to determine a respective target trajectory for each of the multiple vehicles according to the target collaborative planning scheme.

The transmission module is configured to transmit each of target trajectories to a respective one of the multiple vehicles.

In some embodiments, the first determination module is further configured to: start a specific number of threads in parallel; and randomly determine, through each of the specific number of threads, a respective vehicle priority scheme for the multiple vehicles.

In some embodiments, the second determination module is further configured to: for each of the multi-vehicle priority schemes, perform trajectory planning on each of the multiple vehicles one by one according to a give-way priority sequence of the vehicle in the multi-vehicle priority scheme, to obtain the corresponding collaborative planning scheme.

In some embodiments, the second determination module is further configured to: determine a to-be-planned vehicle from the multiple vehicles according to the multi-vehicle priority scheme; determine a traveling trajectory for the to-be-planned vehicle according to a position of an obstacle in a current environment; add the traveling trajectory into a planned trajectory set; and, responsive to the to-be-planned vehicle being a last vehicle, determine all of trajectories in the planned trajectory set as the collaborative planning scheme corresponding to the multi-vehicle priority scheme.

In some embodiments, the second determination module is further configured to: responsive to the to-be-planned vehicle being not the last vehicle, update a vehicle traveling according to the traveling trajectory into the current environment as an obstacle; determine a vehicle following the to-be-planned vehicle as a new to-be-planned vehicle according to the multi-vehicle priority scheme; determine a traveling trajectory for the new to-be-planned vehicle according to a position of an obstacle in an updated current environment; and add the traveling trajectory into the planned trajectory set.

In some embodiments, the traveling trajectory includes a traveling path and a matching speed during the traveling along the traveling path. The obstacle in the current environment includes a static obstacle and a dynamic obstacle. Correspondingly, the second determination module is further configured to: perform path planning by using a hybrid A* algorithm according to a position of the static obstacle, to obtain a traveling path of the to-be-planned vehicle; determine an S-T scatter diagram corresponding to the dynamic obstacle based on the traveling path and a movement trajectory of the dynamic obstacle; and, based on the S-T scatter diagram, determine the matching speed when the to-be-planned vehicle travels along the traveling path by using the A* algorithm.

In some embodiments, the quality evaluation result includes a respective total mileage of each collaborative planning scheme. The evaluation module is further configured to: determine path lengths of vehicles in each collaborative planning scheme; and, for each collaborative planning scheme, accumulate the path lengths of the vehicles in the collaborative planning scheme, to obtain the total mileage of the collaborative planning scheme. The third determination module is further configured to, according to the respective total mileage of each collaborative planning scheme, determine the collaborative planning scheme of which total mileage meets a condition as the target collaborative planning scheme from the specific number of collaborative planning schemes.

The descriptions of the above apparatus embodiments are similar to the descriptions of the above method embodiments, and have similar beneficial effects to the method embodiments. For technical details that are not disclosed in the apparatus embodiments of the present disclosure, refer to the descriptions of the method embodiments of the present disclosure for understanding.

It is to be noted that, in the embodiments of the present disclosure, if the above multi-vehicle collaborative trajectory planning method is implemented in the form of a software functional module and sold or used as an independent product, it can be stored in the computer-readable storage medium. Based on such an understanding, the technical solutions of the embodiments of the present disclosure substantially or parts making contributions to the related art may be embodied in form of a software product, and the computer software product is stored in a storage medium, including a plurality of instructions for causing a computer device (which may be a personal computer, a server, a network device or the like) to execute all or part of the method in each embodiment of the present disclosure. The foregoing storage medium includes: a USB flash disk, a mobile Hard Disk Drive (HDD), a Read-Only Memory (ROM), and various media that can store program codes, such as a magnetic disk, or an optical disk. In this way, the embodiments of the present disclosure are not limited to any specific combination of hardware and software.

Correspondingly, an embodiment of the present disclosure provides a computer-readable storage medium. The computer-readable storage medium stores a computer program. The above method is implemented when the computer program is performed by a processor.

Correspondingly, an embodiment of the present disclosure provides a computer device. The computer device includes a memory and a processor. The memory stores a computer program executable by the processor. The processor, when executing the program, implements operations in the above method.

An embodiment of the present disclosure further provides a computer program product. The computer program product includes a non-transitory computer-readable storage medium storing a computer program. When the computer program is read and executed by a computer, any of the method in the foregoing embodiments is implemented. The computer program product can be specifically implemented in a manner of hardware, software or a combination thereof. In some embodiments, the computer program product is embodied as a computer storage medium. In some other embodiments, the computer program product is embodied as a software product, such as a Software Development Kit (SDK) and the like.

It is to be pointed out here that the above descriptions about the storage medium and device embodiments are similar to descriptions about the method embodiments and beneficial effects similar to those of the method embodiments are achieved. Technical details undisclosed in the storage medium and device embodiments of the present disclosure may be understood with reference to the descriptions about the method embodiments of the present disclosure.

It is to be understood that "one embodiment" and "an embodiment" mentioned in the whole specification mean that specific features, structures or characteristics related to the embodiment are included in at least one embodiment of the present disclosure. Therefore, "in one embodiment" or "in an embodiment" appearing at any place of the whole specification does not always refer to the same embodiment. In addition, these specific features, structures or characteristics may be combined in one or more embodiments in any proper manner. It is to be understood that, in various enibodiments of the present disclosure, the sequence number of each process does not mean the sequence of execution. The execution sequence of each process should be determined by its functions and internal logic, which should not constitute any limitation on the implementation process of the embodiments of the present disclosure. The serial numbers of the foregoing embodiments of the present disclosure are merely for description, and do not represent the superiority or inferiority of the embodiments.

It is to be noted that terms "include" and "comprise" or any other variant thereof is intended to cover nonexclusive inclusions herein, so that a process, method, object or apparatus including a series of components not only includes those components but also includes other components which are not clearly listed or further includes components intrinsic to the process, the method, the object or the apparatus. Under the condition of no more limitations, a component defined by the statement "including a/an . . . " does not exclude existence of the same other components in a process, method, object or apparatus including the component.

In several embodiments provided by the present disclosure, it is to be understood that the disclosed device and method may be implemented in other ways. The device embodiment described above is only schematic, and for example, division of the units is only logic function division, and other division manners may be adopted during practical implementation. For example, a plurality of units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the present disclosure may be integrated into a processing unit, each unit may also serve as an independent unit and two or more than two units may also be integrated into a unit. The integrated unit may be implemented in a hardware form and may also be implemented in form of hardware and software functional unit.

Those of ordinary skill in the art should know that all or part of the operations of the method embodiment may be implemented by related hardware instructed through a program, the program may be stored in a computer-readable storage medium, and the program is executed to execute the steps of the method embodiment. The storage medium which may be a volatile storage medium includes: a mobile storage device, an ROM, and various media that can store program codes, such as a magnetic disk, or an optical disk.

If the integrated unit is implemented in the form of the software functional unit and sold or used as an independent product, it can be stored in the computer readable storage medium. Based on such an understanding, the technical solutions of the embodiments of the present disclosure substantially or parts making contributions to the related art may be embodied in form of a software product, and the computer software product is stored in a storage medium, including a plurality of instructions for causing a computer device (which may be a personal computer, a server, a network device or the like) to execute all or part of the method in each embodiment of the present disclosure. The foregoing storage medium includes a portable storage device, an ROM, and various media that can store program codes, such as a magnetic disk, or an optical disk.

The above is only the implementations of the present disclosure and not intended to limit the scope of protection of the present disclosure. Any variations or replacements apparent to those skilled in the art within the technical scope disclosed by the present disclosure shall fall within the scope of protection of the present disclosure. Therefore, the protection scope of the present disclosure shall be subject to the protection scope of the claims.

INDUSTRIAL APPLICABILITY

Embodiments of the present disclosure provide a multi-vehicle collaborative trajectory planning method, apparatus and system, and a device, a storage medium, and a computer program product. The method includes: determining a specific number of different multi-vehicle priority schemes for multiple vehicles; determining, by using a sequential planning policy, a respective collaborative planning scheme for each of the multi-vehicle priority schemes; performing quality evaluation on each collaborative planning scheme to obtain a respective quality evaluation result; and according to the quality evaluation results, determining a target collaborative planning scheme from the specific number of collaborative planning schemes. By using the method to performing collaborative trajectory planning on the multiple vehicles, the quality of collaborative trajectory planning may be effectively improved, and the trajectory planning efficiency can be enhanced.

The invention claimed is:

1. A method for automatic driving of multiple vehicles, performed by a processor, comprising:
receiving respective present position information and environment perception information that are transmitted by each of the multiple vehicles, wherein the environment perception information is collected by a sensor mounted on each of the multiple vehicles, and the sensor comprises at least one of: a vehicle speed sensor, an acceleration sensor, an angular velocity sensor, a lidar, a camera, or an inertial sensor;
determining a specific number of different multi-vehicle priority schemes for the multiple vehicles;
determining, by using a sequential planning policy, a respective collaborative planning scheme for each of the multi-vehicle priority schemes according to the respective present position information and the environment perception information, to obtain a specific number of collaborative planning schemes;
performing quality evaluation on each of the specific number of collaborative planning schemes to obtain a respective quality evaluation result, to obtain a specific number of quality evaluation results;
determining a target collaborative planning scheme from the specific number of collaborative planning schemes according to the specific number of quality evaluation results;
determining a respective target trajectory for each of the multiple vehicles according to the target collaborative planning scheme, to obtain multiple target trajectories; and
transmitting each of the multiple target trajectories to a respective one of the multiple vehicles, to indicate each of the multiple vehicles to travel according to a corresponding target trajectory of the multiple target trajectories.

2. The method of claim 1, wherein determining the specific number of different multi-vehicle priority schemes for the multiple vehicles comprises:
starting a specific number of threads in parallel; and
randomly determining, through each of the specific number of threads, a respective multi-vehicle priority scheme for the multiple vehicles.

3. The method of claim 1, wherein determining, by using the sequential planning policy, the respective collaborative planning scheme for each of the multi-vehicle priority schemes comprises:
for each of the multi-vehicle priority schemes, performing trajectory planning on each of the multiple vehicles one by one according to a give-way priority sequence of the vehicle in the multi-vehicle priority scheme, to obtain a collaborative planning scheme corresponding to the multi-vehicle priority scheme.

4. The method of claim 3, wherein performing the trajectory planning on each of the multiple vehicles one by one according to the give-way priority sequence of the vehicle in the multi-vehicle priority scheme, to obtain the collaborative planning scheme corresponding to the multi-vehicle priority scheme comprises:
determining a to-be-planned vehicle from the multiple vehicles according to the multi-vehicle priority scheme;

determining a traveling trajectory for the to-be-planned vehicle according to a position of an obstacle in a present environment;

adding the traveling trajectory into a planned trajectory set; and responsive to the to-be-planned vehicle being a last vehicle, determining all of trajectories in the planned trajectory set as the collaborative planning scheme corresponding to the multi-vehicle priority scheme.

5. The method of claim 4, wherein performing the trajectory planning on each of the multiple vehicles one by one according to the give-way priority sequence of the vehicle in the multi-vehicle priority scheme, to obtain the collaborative planning scheme corresponding to the multi-vehicle priority scheme further comprises:

responsive to the to-be-planned vehicle being not the last vehicle, updating a vehicle traveling according to the traveling trajectory into the present environment as an obstacle;

determining a vehicle following the to-be-planned vehicle as a new to-be-planned vehicle according to the multi-vehicle priority scheme;

determining a traveling trajectory for the new to-be-planned vehicle according to a position of an obstacle in an updated present environment; and adding the traveling trajectory into the planned trajectory set.

6. The method of claim 4, wherein the traveling trajectory comprises a traveling path and a matching speed during traveling along the traveling path; the obstacle in the present environment comprises a static obstacle and a dynamic obstacle; and wherein determining the traveling trajectory for the to-be-planned vehicle according to the position of the obstacle in the present environment comprises:

performing path planning by using a hybrid A* algorithm according to a position of the static obstacle, to obtain a traveling path of the to-be-planned vehicle;

determining a Space-Time (S-T) scatter diagram corresponding to the dynamic obstacle based on the traveling path and a movement trajectory of the dynamic obstacle; and determining, based on the S-T scatter diagram and by using the hybrid A* algorithm, the matching speed when the to-be-planned vehicle travels along the traveling path.

7. The method of claim 1, wherein the quality evaluation result comprises a respective total mileage of each of the collaborative planning schemes; and wherein performing the quality evaluation on each of the specific number of collaborative planning schemes to obtain the respective quality evaluation result comprises:

determining path lengths of vehicles in each of the collaborative planning schemes; and for each of the collaborative planning schemes, accumulating the path lengths of the vehicles in the collaborative planning scheme, to obtain the total mileage of the collaborative planning scheme; and correspondingly, determining the target collaborative planning scheme from the specific number of collaborative planning schemes according to the specific number of quality evaluation results comprises:

determining, according to the respective total mileage of each of the collaborative planning schemes, a collaborative planning scheme of which total mileage satisfies a condition among the specific number of collaborative planning schemes as the target collaborative planning scheme.

8. The method of claim 1, wherein the specific number of different multi-vehicle priority schemes, the specific number of collaborative planning schemes, and the specific number of quality evaluation results are each integers greater than 1.

9. The method of claim 1, wherein each of the multi-vehicle priority schemes comprises give-way priority sequences of all of the multiple vehicles.

10. A computer device, comprising:
a processor, configured to:
receive, through a centralized platform, respective present position information and environment perception information that are transmitted by each of multiple vehicles, wherein the environment perception information is collected by a sensor mounted on each of the multiple vehicles, and the sensor comprises at least one of: a vehicle speed sensor, an acceleration sensor, an angular velocity sensor, a lidar, a camera, or an inertial sensor;

determine, through the centralized platform, a specific number of different multi-vehicle priority schemes for the multiple vehicles;

determine, through the centralized platform, by using a sequential planning policy, a respective collaborative planning scheme for each of the multi-vehicle priority schemes according to the respective present position information and the environment perception information, to obtain a specific number of collaborative planning schemes;

perform, through the centralized platform, quality evaluation on each of the specific number of collaborative planning schemes to obtain a respective quality evaluation result, to obtain a specific number of quality evaluation results;

determine, through the centralized platform, a target collaborative planning scheme from the specific number of collaborative planning schemes according to the specific number of quality evaluation results;

determine, through the centralized platform, a respective target trajectory for each of the multiple vehicles according to the target collaborative planning scheme, to obtain multiple target trajectories; and transmit, through the centralized platform, each of the multiple target trajectories to a respective one of the multiple vehicles, to indicate each of the multiple vehicles to travel according to a corresponding target trajectory of the multiple target trajectories.

11. The computer device of claim 10, wherein the processor is further configured to:
start a specific number of threads in parallel; and
randomly determine, through each of the specific number of threads, a respective multi-vehicle priority scheme for the multiple vehicles.

12. The computer device of claim 10, wherein the processor is further configured to:
for each of the multi-vehicle priority schemes, perform trajectory planning on each of the multiple vehicles one by one according to a give-way priority sequence of the vehicle in the multi-vehicle priority scheme, to obtain a collaborative planning scheme corresponding to the multi-vehicle priority scheme.

13. The computer device of claim 12, wherein the processor is further configured to:
determine a to-be-planned vehicle from the multiple vehicles according to the multi-vehicle priority scheme;

determine a traveling trajectory for the to-be-planned vehicle according to a position of an obstacle in a present environment;

add the traveling trajectory into a planned trajectory set; and responsive to the to-be-planned vehicle being a last vehicle, determine all of trajectories in the planned trajectory set as the collaborative planning scheme corresponding to the multi-vehicle priority scheme.

14. The computer device of claim 13, wherein the processor is further configured to:

responsive to the to-be-planned vehicle being not the last vehicle, update a vehicle traveling according to the traveling trajectory into the present environment as an obstacle;

determine a vehicle following the to-be-planned vehicle as a new to-be-planned vehicle according to the multi-vehicle priority scheme;

determine a traveling trajectory for the new to-be-planned vehicle according to a position of an obstacle in an updated present environment; and add the traveling trajectory into the planned trajectory set.

15. The computer device of claim 14, wherein the traveling trajectory comprises a traveling path and a matching speed during traveling along the traveling path; the obstacle in the present environment comprises a static obstacle and a dynamic obstacle; and correspondingly, the processor is further configured to:

perform path planning by using a hybrid A* algorithm according to a position of the static obstacle, to obtain a traveling path of the to-be-planned vehicle;

determine a Space-Time (S-T) scatter diagram corresponding to the dynamic obstacle based on the traveling path and a movement trajectory of the dynamic obstacle; and determine, based on the S-T scatter diagram and by using the hybrid A* algorithm, the matching speed when the to-be-planned vehicle travels along the traveling path.

16. The computer device of claim 10, wherein the quality evaluation result comprises a respective total mileage of each of the collaborative planning scheme;

wherein the processor is further configured to:

determine path lengths of vehicles in each of the collaborative planning schemes;

for each of the collaborative planning schemes, accumulate the path lengths of the vehicles in the collaborative planning scheme, to obtain the total mileage of the collaborative planning scheme; and determine, according to the respective total mileage of each of the collaborative planning schemes, a collaborative planning scheme of which total mileage satisfies a condition among the specific number of collaborative planning schemes as the target collaborative planning scheme.

17. The computer device of claim 10, wherein each of the multi-vehicle priority schemes comprises give-way priority sequences of all of the multiple vehicles.

18. A non-transitory computer-readable storage medium having stored therein a computer program that, when executed by a processor, causes the processor to perform operations comprising:

receiving, through a centralized platform, respective present position information and environment perception information that are transmitted by each of multiple vehicles, wherein the environment perception information is collected by a sensor mounted on each of the multiple vehicles, and the sensor comprises at least one of: a vehicle speed sensor, an acceleration sensor, an angular velocity sensor, a lidar, a camera, or an inertial sensor;

determining, through the centralized platform, a specific number of different multi-vehicle priority schemes for the multiple vehicles;

determining, through the centralized platform, by using a sequential planning policy, a respective collaborative planning scheme for each of the multi-vehicle priority schemes according to the respective present position information and the environment perception information, to obtain a specific number of collaborative planning schemes;

performing, through the centralized platform, quality evaluation on each of the specific number of collaborative planning schemes to obtain a respective quality evaluation result, to obtain a specific number of quality evaluation results;

determining, through the centralized platform, a target collaborative planning scheme from the specific number of collaborative planning schemes according to the specific number of quality evaluation results;

determining, through the centralized platform, a respective target trajectory for each of the multiple vehicles according to the target collaborative planning scheme, to obtain multiple target trajectories; and transmitting, through the centralized platform, each of the multiple target trajectories to a respective one of the multiple vehicles, to indicate each of the multiple vehicles to travel according to a corresponding target trajectory of the multiple target trajectories.

19. The non-transitory computer-readable storage medium of claim 18, wherein determining the specific number of different multi-vehicle priority schemes for the multiple vehicles comprises:

starting a specific number of threads in parallel; and randomly determining, through each of the specific number of threads, a respective multi-vehicle priority scheme for the multiple vehicles.

20. The non-transitory computer-readable storage medium of claim 18, wherein determining, by using the sequential planning policy, the respective collaborative planning scheme for each of the multi-vehicle priority schemes comprises:

for each of the multi-vehicle priority schemes, performing trajectory planning on each of the multiple vehicles one by one according to a give-way priority sequence of the vehicle in the multi-vehicle priority scheme, to obtain a collaborative planning scheme corresponding to the multi-vehicle priority scheme.

* * * * *